(12) United States Patent
Cribbs

(10) Patent No.: US 6,980,874 B2
(45) Date of Patent: Dec. 27, 2005

(54) SYSTEM AND METHOD FOR DETECTING AN ANOMALOUS CONDITION IN A MULTI-STEP PROCESS

(75) Inventor: Timothy B. Cribbs, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/609,628

(22) Filed: Jul. 1, 2003

(65) Prior Publication Data

US 2005/0004696 A1    Jan. 6, 2005

(51) Int. Cl.⁷ ............................................. G06F 19/00
(52) U.S. Cl. ...................... 700/110; 700/108; 702/183; 702/185
(58) Field of Search .................... 700/108–110, 28, 700/49, 104, 148; 702/183, 185

(56) References Cited

U.S. PATENT DOCUMENTS

| | | | |
|---|---|---|---|
| 4,937,763 A | | 6/1990 | Mott |
| 5,009,833 A | | 4/1991 | Takeuchi et al. |
| 5,122,976 A | | 6/1992 | Bellows et al. |
| 5,203,188 A | | 4/1993 | Osgood et al. |
| 5,331,565 A | * | 7/1994 | Hattori et al. ............... 700/28 |
| 5,339,257 A | | 8/1994 | Layden et al. |
| 5,402,521 A | * | 3/1995 | Niida et al. .................. 706/20 |
| 5,566,092 A | * | 10/1996 | Wang et al. ................ 702/185 |
| 5,568,092 A | * | 10/1996 | Shimizu et al. ............ 702/185 |
| 5,602,761 A | * | 2/1997 | Spoerre et al. ............. 702/179 |
| 5,650,940 A | | 7/1997 | Tonozuka et al. |
| 5,691,909 A | | 11/1997 | Frey |
| 5,847,957 A | | 12/1998 | Cohen |
| 6,068,887 A | * | 5/2000 | Isobe et al. ................. 427/433 |
| 6,181,972 B1 | * | 1/2001 | Guedeney et al. ............ 700/29 |
| 6,181,975 B1 | | 1/2001 | Gross et al. |
| 6,782,304 B1 | | 8/2004 | Tsugeno et al. |
| 6,792,388 B2 | | 9/2004 | Laitinen-Vellonen |
| 6,795,798 B2 | | 9/2004 | Eryurek et al. |
| 6,819,960 B1 | | 11/2004 | McKelvey et al. |

(Continued)

OTHER PUBLICATIONS

U.S. Appl. No. 10/609,550, filed Jul. 1, 2003 (and the art cited therein).

(Continued)

Primary Examiner—Leo Picard
Assistant Examiner—Alexander Kosowski
(74) Attorney, Agent, or Firm—Hunton & Williams

(57) ABSTRACT

A technique for analyzing an anomalous condition in a process for producing a product is described, where the process includes plural subprocesses for performing operations on the product. The technique includes: (a) for each of the subprocesses, providing sensor output from at least one sensor used to measure information pertaining to the status of the respective subprocess; (b) for each of the subprocesses, extracting at least one representative value that is characteristic of a pattern expressed in the output, thus generating a plurality of representative values for the process as a whole; (c) retrieving data from a knowledge base, the data including a plurality of representative values, and also including information which maps the representative values to associated anomalous conditions; (d) analyzing the plurality of representative values output from the parameter extracting step with respect to the data stored in the knowledge base, and for generating a diagnostic result which diagnoses an anomalous condition in the process, and also identifies at least one of the subprocesses which has caused the anomalous condition; and (e) using the diagnostic result to affect corrective action to the at least one of the subprocesses which has caused the anomalous condition by adjusting at least one actuator that controls the at least one subprocess.

20 Claims, 9 Drawing Sheets

U.S. PATENT DOCUMENTS

| | | |
|---|---|---|
| 2002/0116980 A1 | 8/2002 | Kerr et al. |
| 2004/0098218 A1 | 5/2004 | Ito et al. |
| 2004/0102864 A1 * | 5/2004 | Stack et al. .................. 700/110 |
| 2004/0158432 A1 | 8/2004 | King et al. |

OTHER PUBLICATIONS

U.S. Appl. No. 10/609549, filed Jul. 1, 2003 (and the art cited therein).

* cited by examiner

| anomaly index and descriptor | sensor(s) | characteristic shape | diagnoses |
|---|---|---|---|
| 1 heads swing very light | X5, X1 | ![waveform] | - control sytem running below optimal level |
| 2 bad setup, excessive forces | model feedback forces | ![dotted pattern] | - model grades mismapped |

FIG. 7

SYSTEM AND METHOD FOR DETECTING AN ANOMALOUS CONDITION IN A MULTI-STEP PROCESS

BACKGROUND OF THE INVENTION

The present invention generally relates to a system and method for detecting an anomalous condition. In a more specific embodiment, the present invention relates to a system and method for detecting an anomalous condition which occurs in the production of a manufactured good.

Modern manufacturing plants produce products using a complex series of operations. The manufacturing plants generally rely on electronic equipment to govern these operations. For instance, in a typical plant, a computer equipment is used to transmit instructions to machines used to manufacture a product. Further, the computer equipment receives information collected from sensors interspersed throughout the process. These sensors collect information regarding the status of the machines and the quality of products processed by the machines.

The machines and other equipment used in the manufacturing plant occasionally function in a substandard manner, as manifested, for example, in the generation of out-of-tolerance products. To address this problem, many manufacturing plants employ an expert who examines the output of the sensors. The expert may generate a hypothesis regarding the cause of an anomaly based on his or her analysis of the output of the sensors. The expert's judgment is typically based on his or her prior encounters with similar failure conditions. After forming a conclusion, the expert instructs the personnel operating the plant machines to make one or more adjustments to correct the anomalous condition.

Such a technique has drawbacks. Even experts are subject to errors in judgment. Accordingly, the expert may misdiagnose the cause of the anomalous condition, and/or provide incorrect instructions for remedying the problem. This may require the expert to make another visit to the plant, reanalyze the sensor outputs, and make another diagnosis.

Further, some industries may have relatively few individuals that are qualified to diagnose the failure conditions in the manufacturing plant. The scarcity of experts may result in a situation where an expert is not immediately available to analyze the cause of the anomaly.

Both of the above difficulties may result in delays in production and/or the production of substandard goods. This may lead to a possible loss of revenue for the manufacturing plant. In addition, if such an expert is not employed by the company running the manufacturing plant, the company must pay for the services of the expert.

There is accordingly a need for a more satisfactory system and method for diagnosing the cause of anomalies in the production of goods, and for providing appropriate corrective action.

BRIEF SUMMARY OF THE INVENTION

A technique is disclosed for analyzing an anomalous condition in a process for producing a product, where the process includes plural subprocesses for performing operations on the product. The technique includes: (a) for each of the subprocesses, providing sensor output from at least one sensor used to measure information pertaining to the status of the respective subprocess; (b) for each of the subprocesses, extracting at least one representative value that is characteristic of a pattern expressed in the output, thus generating a plurality of representative values for the process as a whole; (c) retrieving data from a knowledge base, the data including a plurality of representative values, and also including information which maps the representative values to associated anomalous conditions; (d) analyzing the plurality of representative values output from the parameter extracting step with respect to the data stored in the knowledge base, and for generating a diagnostic result which diagnoses an anomalous condition in the process, and also identifies at least one of the subprocesses which has caused the anomalous condition; and (e) using the diagnostic result to affect corrective action to the at least one of the subprocesses which has caused the anomalous condition by adjusting at least one actuator that controls the at least one subprocess.

The use of parameter extracting and pattern recognition steps to automatically analyze anomalies provides a more efficient and cost-effective solution for diagnosing anomalies (compared to exclusive use of human analysis). For instance, the above-described solution eliminates the need for the local site to retain the services of a human expert to perform failure diagnosis for a manufacturing process.

Still further features and advantages of the present invention are identified in the ensuing description, with reference to the drawings identified below.

BRIEF DESCRIPTION OF THE DRAWINGS

FIG. 7 shows an example of information obtained from sensors used to monitor a cold rolling process, along with diagnostic information associated with the sensor outputs.

DETAILED DESCRIPTION OF THE INVENTION

The term "products" used herein refers to any type of products produced by any type of process and/or machine (or series of machines). In a more particular embodiment, the products pertain to goods produced in multiple stages, such as paper goods or metal goods. Such goods are produced by a generally continuously running process, and then typically separated and sold as discrete products. For instance, in the case of the production of paper and metal goods, a manufacturing plant may produce multiple sheets or rolls of such material for shipment to consumers.

Figure 1:
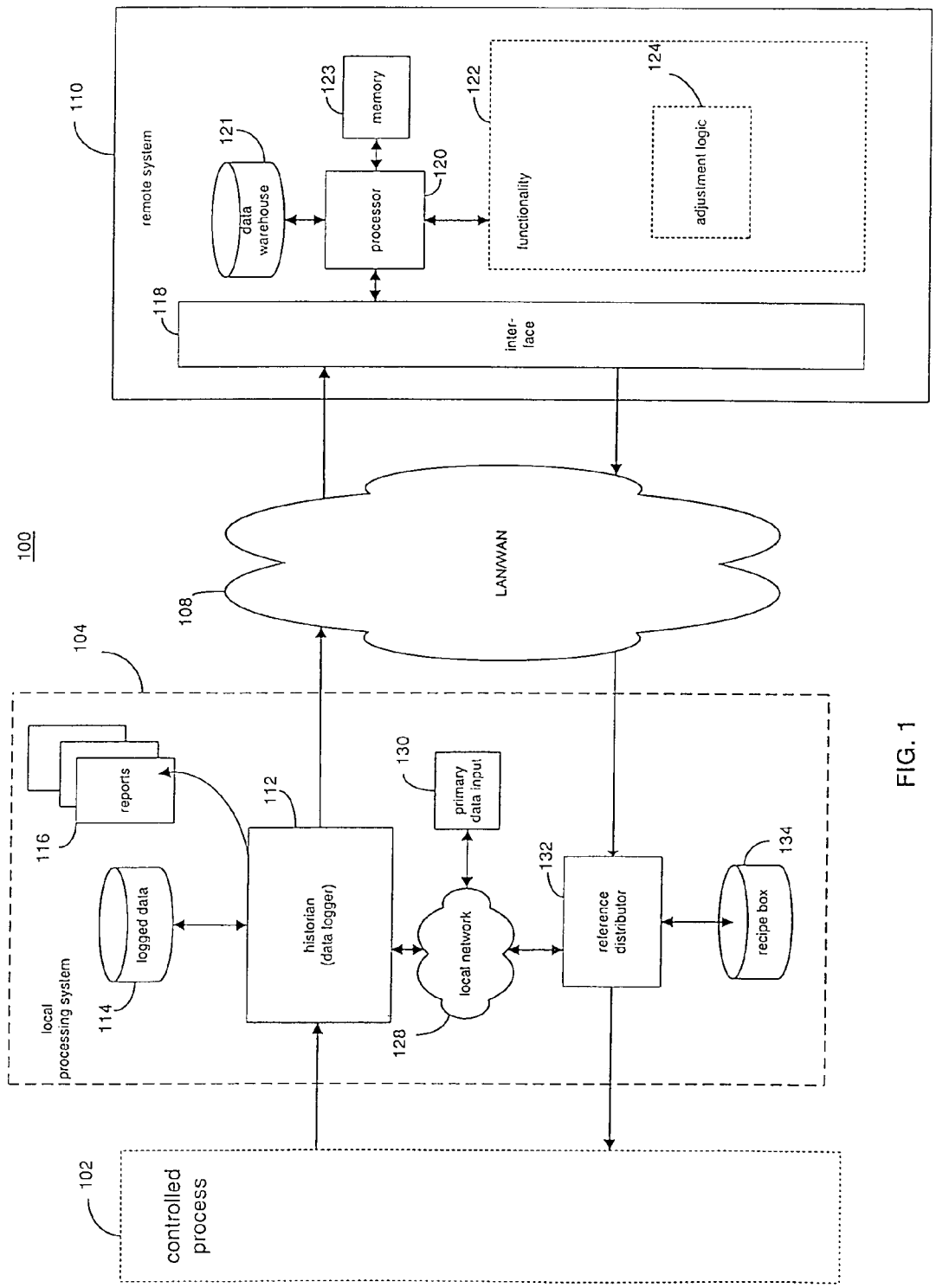
FIG. 1 shows an exemplary system for implementing the present invention.

FIG. 1 shows an exemplary system 100 for implementing the present invention. By way of overview, the system 100 includes a controlled process 102 coupled to a local processing system 104. A packet network 108 couples the local processing system 104 to a remote system 110. The remote system 110 provides remote control of the controlled process 102 via the packet network 108 and local processing system 104. Although not shown, the remote system 110 may be coupled to multiple controlled processes and associated local processing systems. The following discussion provides additional detail regarding each of the above-identified features.

The controlled process 102 generically represents any equipment used to manufacture a product. For instance, although not specifically illustrated, the controlled process 102 may include multiple machines for carrying out operations on goods in a series of stages. Such machines may include various actuators for governing the operation of the machines, such as actuators for opening and closing valves, adjusting the speed of moving parts, controlling the temperature or gas pressure in the machines, etc. In addition, the controlled process 102 may include one or more local control units for providing local control of the machines used in the process.

The controlled process 102 further includes various sensors for collecting information regarding the performance of the machines used in the process, such as various x-ray sensors for measuring product thickness, tension sensors, temperature sensors, etc.

The local control system 104 generically represents equipment used to directly interact with the controlled process 102. For instance, the local processing system 104 may include control equipment that is located at the same facility (e.g., the same mill site) as the controlled process 102. Alternatively, the local system 104 may be located at a facility nearby the mill site, or otherwise closely associated with the mill site.

The local control system 104 includes a historian 112. The historian 112 comprises a data management unit that receives information from the controlled process 102 (such as information received from the sensors used to monitor the process 102). Such data may be transferred to a logged data file 114 for archiving, and/or may be processed to generate one or more reports 116, e.g., on a periodic basis.

The local system 104 may also include a reference distributor 132. The distributor 132 forwards a control model to the controlled process 102, where it is used to configure local controllers used in the process 102. As discussed in the Background section, a typical control model defines a relationship for controlling the process as a function of prevailing conditions in the process. For instance, an exemplary control model may define a set of reference points that configure the actuators to function in a prescribed manner. These reference points define a "recipe" used for controlling the actuators based on a particular condition that is prevailing in the controlled process 102. The local processing system 104 further includes a recipe box 134 for storing one or more recipes for use in controlling the process 102.

The historian 112 and reference distributor 132 may comprise discrete logic for performing the above-described functions. Alternatively, the historian 112 and reference distributor 132 may comprise computer units including conventional computer hardware (not shown), such as a processor (e.g., a microprocessor), Random Access Memory (RAM), Read Only Memory (ROM), etc. Software functionality may be stored in such computer units to program these units to perform the above-described tasks.

The local processing system 104 may also include a local network 128 for coupling various modules included within the local processing system 104. The local network 128 may also couple the modules contained in the local processing system 104 to the control units and other functionality contained within the controlled process 102. Such a network 128 may comprise a local area network (LAN), or some of other type of network.

The network 128 may also interact with various other units, such as the primary data input unit 130. The primary data input unit 130 serves as a portal for receiving scheduling orders that will govern the operation of the controlled process 102 from a high-level perspective. The primary data input unit 130 may also serve as a portal for interfacing with various user workstations. Such workstations may be manned by personnel who are monitoring the process 102 and wish to make manual adjustments to the process 102 based on their assessment of anomalies in the process or other perceived events.

The network 108 couples the local processing system 104 with the remote processing system 110. More specifically, the local processing system 104 may forward information collected via the historian 112 to the remote system 110 via the network 108. Further, the local processing system 104 may receive information from the remote system 110 via such network 108. More specifically, as will be explained in greater detail below, the remote system 110 receives information regarding sensed conditions in the controlled process 102 via the local processing system 104. On the basis of this information, the remote system 110 generates a recipe for use by the controlled process 102 in controlling its actuators. This recipe is transmitted to the controlled process 102 via the reference distributor 132 of the local processing system 104.

In a preferred embodiment, the network 108 comprises a wide-area network (WAN) supporting TCP/IP packet traffic (i.e., Transmission Control Protocol/Internet Protocol traffic). In a more specific preferred embodiment, the network 108 comprises the Internet or an intranet, etc. In other applications, the network 108 may comprise other types of networks governed by other types of protocols.

The network 108 may be formed, in whole or in part, from hardwired copper-based lines, fiber optic lines, wireless connectivity, etc. Further, the network 108 may operate using any type of network-enabled code, such as HyperText Markup Language (HTML), Dynamic HTML, Extensible Markup Language (XML), Extensible Stylesheet Language (XSL), Document Style Semantics and Specification Language (DSSSL), Cascading Style Sheets (CSS), etc.

In terms of architecture, the remote system 110 may be formed as a conventional server (e.g., in the context of the well known client-server architecture). In an alternative embodiment, the remote system 110 may be implemented using an architecture other than a client-server type architecture. For instance, the remote system 110 may be implemented using a mainframe-type architecture. In one embodiment, the remote system 110 comprises a single computer. Alternatively, the remote system 110 may comprise multiple computers connected together in a distributed fashion, each of which may implement/administer a separate aspect of the functions performed by the remote system 110.

More specifically, the remote system 110 may include conventional head-end components, including a processor 120 (such as a microprocessor), memory 123, cache (not shown), communication interface 118, and database 121. The processor 120 serves as a central engine for executing machine instructions. The memory 123 (such as a Random Access Memory, or RAM, etc.) serves the conventional role of storing program code and other information for use by the processor 120. The communication interface 118 serves the conventional role of interacting with external equipment, such as the local system 104 via the network 108. The database (or data warehouse) 121 serves as a central repository for storing information collected from the local processing system 104, as well as other information. Generally, such a database 121 may comprise a single repository of information. Alternatively, the database 121 may comprise multiple repositories of information coupled to each other in a distributed fashion. A variety of different database platforms can be used to implement the database, including Oracle™ relational database platforms sold commercially by Oracle Corp. Other database platforms, such as, Microsoft SQL™ server, Informix™, DB2 (Database 2), Sybase, etc., may also be used.

The remote system 110 may include general purpose operating software for performing its ascribed server functions. For instance, the remote system 110 may operate using any one of various operating system platforms, such as Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

The remote system 110 may also comprise processing functionality 122. Such processing functionality 122 may represent machine-readable instructions for execution by the processor 120 for carrying out various application-related functions. Such machine-readable instructions may be stored in any type of memory, such as magnetic media, CD ROM, etc. In an alternative embodiment, such functionality 122 may be implemented as discrete logic circuitry (e.g., as housed on special computer cards that plug into the remote system 110 in a conventional fashion).

The functionality 122 may include a number of modules used to generate output which governs the controlled process 102. For instance, the functionality 122 may include control model adjustment logic 124 that examines information regarding the operating conditions in the controlled process 102. From that information, the adjustment logic 124 determines what control model is best suited to control the process. For instance, the adjustment logic 124 may store various algorithms which compute a recipe or adaptation to a recipe previously stored in the local recipe box, 134 based on prevailing sensed conditions in the controlled process 102. Alternatively, the adjustment logic 124 may include a table lookup mechanism which determines a recipe based on prevailing sensed conditions. The specific approach used by the adjustment logic 124 depends on the nature of the process being controlled. Software programs for performing such control are generally commercially available, such as, GE Fanuc Cimplicity™ HMI (Human Machine Interface)

The remote system 110 forwards a calculated recipe or recipe adaptation to the local processor 104. The reference distributor 132 of the local processor 104 then forwards the recipe to the control units of the controlled process 102. In addition, the remote system 110 may also store the recipe in the local recipe box 134. The local recipe box 134 may be used to furnish recipes in the event that the local system 104 cannot access the remote system 110 via the network 108 (e.g., because of a failure in the network 108 or in the remote system 110). The recipes retrieved from the local recipe box 134 may not be optimally suited to the prevailing process conditions. Nevertheless, these recipes may allow for the production of goods within prescribed tolerances. A plant operator may decide to use such non-optimal recipes because this option is deemed more cost-effective than stopping operation in the manufacturing plant.

Figure 2:
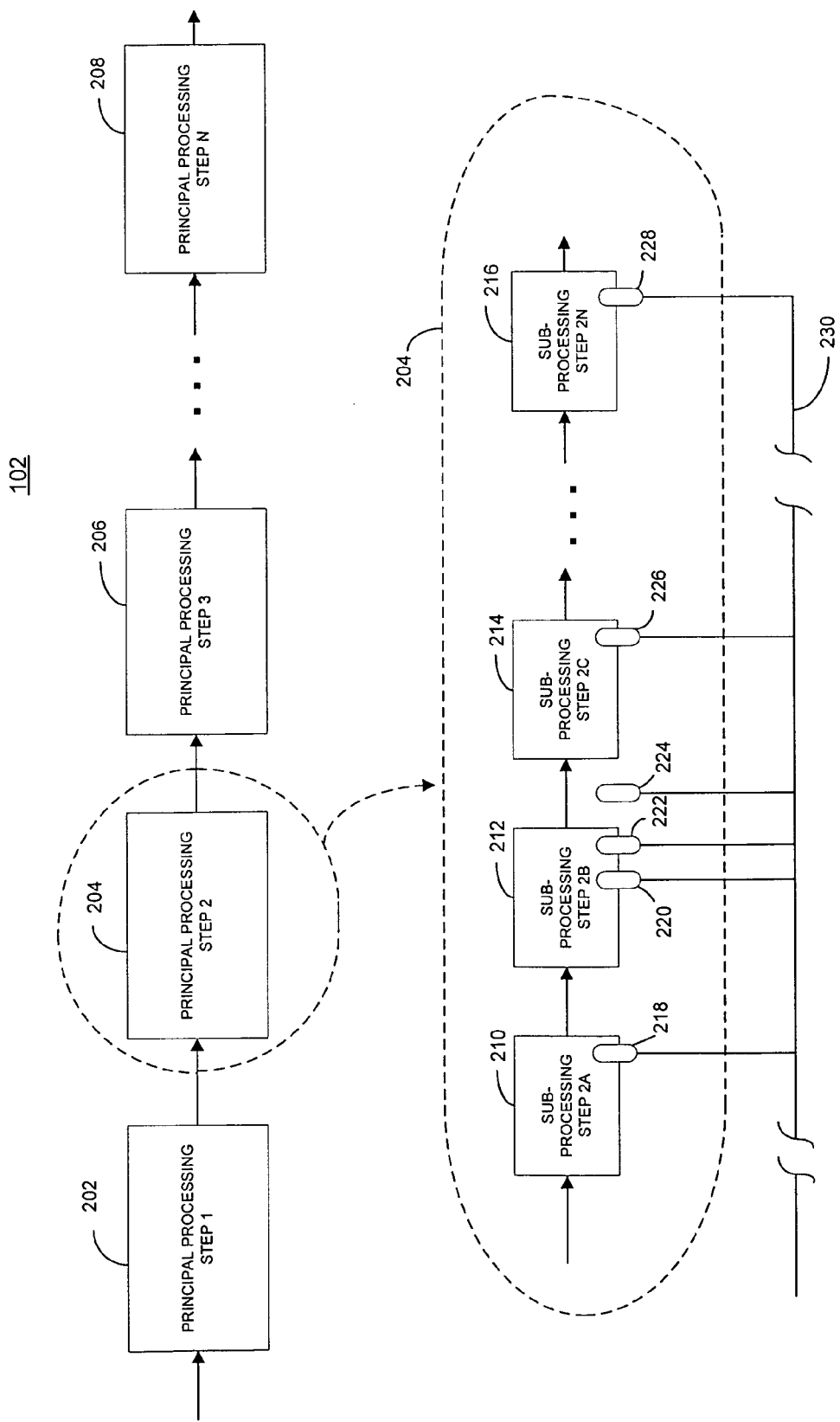
FIG. 2 shows an exemplary process for manufacturing products, where the process includes multiple steps, each of which may include multiple substeps.

FIG. 2 generically shows the controlled process 102. The process 102 includes plural principal processing steps, e.g., steps 202, 204, 206, and 208. Further, each of the principal steps may include plural sub-processing steps associated therewith. In the exemplary case of FIG. 2, for instance, principal step 204 includes subprocessing steps 210, 212, 214, and 216.

For example, the production of steel includes plural principal steps. Well-known exemplary steps include continuous casting (or some other method of steel production, such as conventional ingot teeming, etc.), hot strip processing, pickling and oiling processing, cold strip processing, annealing, temper rolling galvanizing, etc.

Continuous casting provides a technique for transforming steel from its molten state into blooms, ingots, or slabs. In this technique, molten metal is poured into molds. From there, the metal advances down through a series of water-cooled rollers. Another group of guide rollers may further transform the steel into a desired shape.

Hot rolling provides a technique for further shaping the steel. In this technique, a reheat furnace may be used to reheat the steel slabs. The hot rolling technique then passes the slabs through a succession of mills, including, for instance, a blooming mill, a roughing mill, and a finishing mill. These mills progressively reduce the thickness of the metal product. In a final stage, the hot rolling technique rolls the steel into a coil. Mill operators may then transport these coils to other stations for further processing.

A layer of oxides typically forms on the surface of the metal strip during the hot rolling process. This layer is referred to as "scale." The pickling process provides a technique for removing this deleterious layer using an acid. Further, the pickling technique may apply a pickle oil to the surface of the strip to facilitate subsequent cold rolling operations. In a common implementation, pickling procedures are carried out in multiple stages, including an entry stage, scale removal stage, and pickling and exit stages. The entry stage typically includes a mechanism for conveying the coil, a mechanism for uncoiling the coil, and a welder for welding the tail of one coil to the head of another (to provide continuous processing of the rolls). The scale removal stage may include a mechanism for tensioning the strip, storing the strip (e.g., using a looping pit, etc.), and a temper mill to remove scale that forms on the strip surface. The pickling and exit stage may employ acid and rinse tanks to apply acid to the strip, a mechanism for accumulating strip, a mechanism for oiling the strip with the pickling oil, and a mechanism for coiling the strip. In a common implementation, the pickling technique uses the following chemical reaction to remove scale from the surface of the metal strip: $HCl + FeO = H_2O + FeCl_2$.

The cold rolling process involves performing a series of operations on the strip of steel at ambient temperature. Namely, this technique involves uncoiling the strip of metal, passing the strip through a series of rolling stands to successively reduce its thickness, and then recoiling the strip. Each of the stands uses a series of rollers, including two opposing working rollers defining a gap therebetween. Thickness reduction is achieved by successively narrowing the gap in the series of the stands. This technique further involves spraying a lubricating liquid onto the surface of the strip as it passes through the cold rolling mill (e.g., comprising a mixture of water and oil). The cold rolling procedure requires coordinated control of the stands. This is achieved through a collection of x-ray thickness sensors, tension sensors, and automatic gauge control devices (to be described in greater detail in the context of FIGS. 3 and 4 below).

Cold rolling creates the unwanted effect of increasing the hardness of the steel. An annealing technique is therefore applied to the coils to reduce the hardness of the steel. For example, an annealing furnace may be used to perform the annealing operation. Multiple coils may be stacked in the furnace with diffuser plates placed between the coils and an inner cover placed over the stack of coils. This apparatus then uses a base fan to circulate gases (e.g., nitrogen) around the coils and to thereby heat the coils by means of convection. This device may then employ water-filled tubes to cool the coils. The heating and cooling is controlled to ensure that the steel develops the desired mechanical and chemical properties.

A temper rolling procedure may be used to reduce hardness anomalies that may have formed in the strip of steel in the annealing process. This technique may use an uncoiling reel, one or two stands that apply pressure to the strip as it passes through the stands, and a tension reel.

A galvanizing technique applies a coating to the steel to protect it from the environment (e.g., to protect it from rusting). Common coatings include zinc, tin, chrome, or paint. A typical galvanizing technique uses multiple stages to apply the coating. For instance, a hot dip galvanizing line may initially including heating the strip in a furnace. The strip is then partially cooled and passed through a bath of liquid zinc. Air jets remove excessive zinc from the surface of the metal strip. Alternatively, an electrolytic galvanizing line involves passing the strip through a series of electrolytic cells to apply the coating in well-known electrolytic fashion. That is, the cells contain an acid solution containing zinc. Current is passed through the strip, causing zinc ions to adhere to the strip.

As those skilled in the art will appreciate, yet additional principal steps may be included in the production of steel to accommodate particular applications and mill environments. Such addition steps may include, but are not limited to, skin pass rolling, slitting operations, shear operations, continuous annealing lines, cut to length operations, etc.

Returning to FIG. 2, this figure also shows that sensors 218-228 are interspersed throughout the process 102. As indicated there, some of these sensors (e.g., sensor 218) may monitor the performance of a subprocess at some intermediary stage in the subprocess. Other sensors (e.g., sensor 224) may measure the quality of a final product as it is output from a subprocess. A communication line (or lines) 230 receives the signals generated by the sensors and transfers this information to appropriate analysis equipment.

Figure 3:
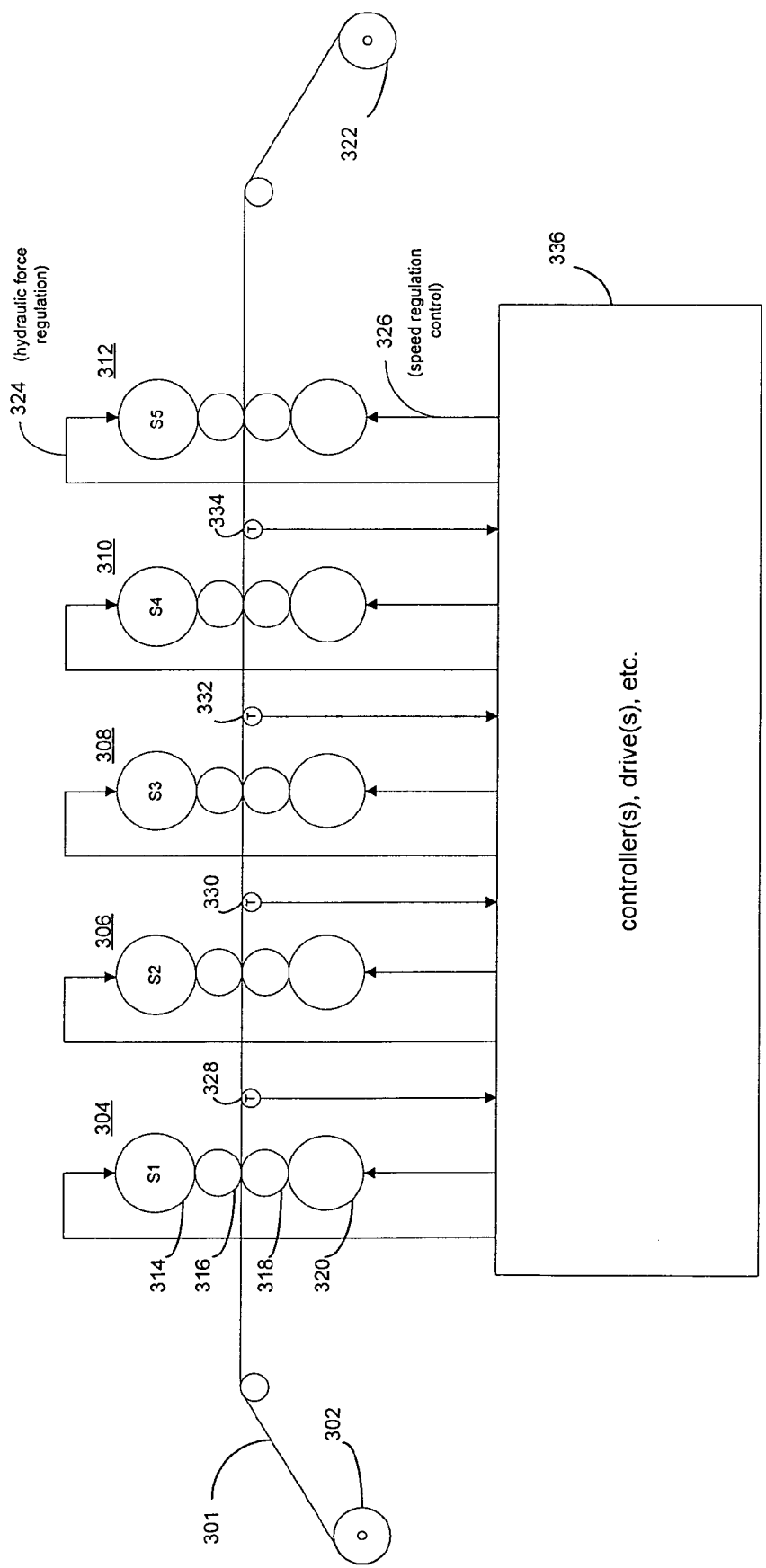
FIG. 3 shows an example of a cold-rolling process, and associated tension sensors used to monitor the process.
Figure 4:
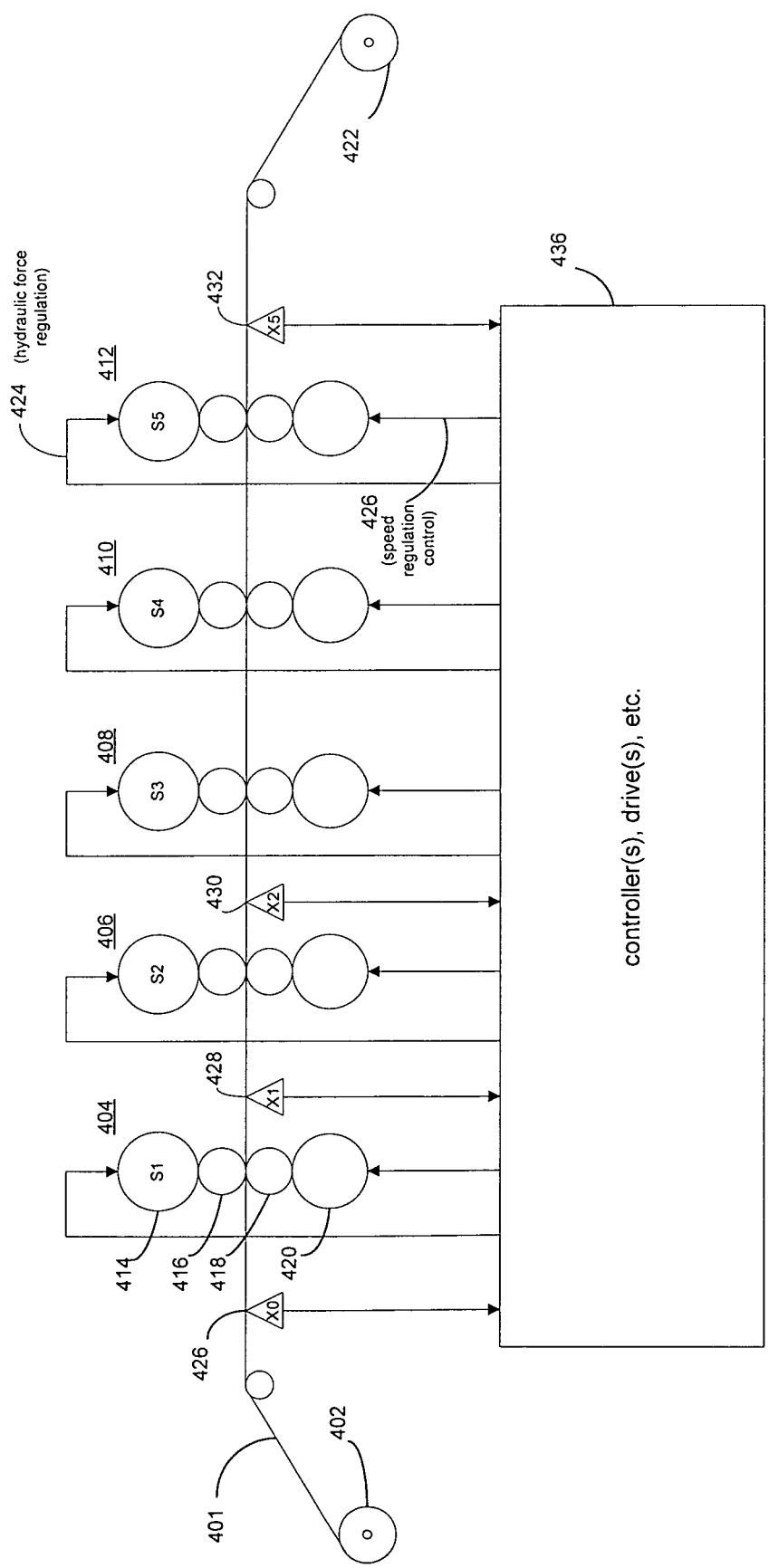
FIG. 4 shows another example of a cold-rolling process, and associated x-ray sensors used to monitor the process.

FIGS. 3 and 4 illustrate exemplary placement of tension and x-ray sensors within a cold rolling mill, and the use of the sensors' output to control the cold rolling operation. A typical mill environment will employ both of the configurations shown in FIGS. 3 and 4. However, the configurations are separated in FIGS. 3 and 4 to facilitate explanation.

To begin with, FIG. 3 shows the tension-regulation aspects of the exemplary cold rolling processing. The cold rolling mill transfers a strip of steel 301 from uncoiling mechanism 302 to coiling mechanism 322 through a series of stands 304 (S1), 306 (S2), 308 (S3), 310 (S4), and 312 (S5). The series of stands apply pressure to the strip 301 and progressively reduce its thickness. Each stand comprises a conventional configuration, comprising a top to bottom arrangement that includes a top backing roll, a top working roll, a bottom working roll, and a bottom or lower backing roll. For example, stand 304 (S1) includes a top backing roll 314, a top working roll 316, a bottom working roll 318, and a bottom backing roll 320. The working rolls define a gap for receiving and compressing the strip 301 as it passes through the gap. The gap in successive stands may become progressively more narrow to achieve the desired thickness reduction in a stepwise fashion.

The mill 300 includes a plurality of tension measuring sensors positioned at various points in the progress of the strip. Namely, a first sensor 328 (T12) is positioned between stands S1 and S2. A second sensor 330 (T23) is positioned between stands S2 and S3. A third sensor 332 (T34) is positioned between stands S3 and S4. A fourth sensor 334 (T45) is positioned between stands S4 and S5. These tension sensors may comprise load cells positioned underneath the strip. The weight placed on the cells is related to the tension between the stands, which may be computed using a trigonometric function.

Equipment 336 generically represents the controllers, drives, etc. used to operate the mill. For example, the equipment 336 may include a plurality of hydraulic force regulators used to govern the force applied to respective stands (e.g., as indicated by exemplary control coupling 324). The equipment 336 may further include a plurality of speed regulators used to govern the speed of the stands in conventional fashion (e.g., as indicated by exemplary control coupling 326). A plurality of tension regulator devices may receive tension measurements from the respective tension sensors and provide output to the hydraulic force regulators and the speed regulators in a conventional fashion.

More specifically, the control logic contained in equipment 336 attempts to maintain the tensions between the stands at a constant level. There are two ways of achieving this objective. According to one technique, the equipment's speed regulators adjust the speed of one stand relative to its adjacent stands. For instance, the equipment 336 may speed up stand 308 (S3) relative to stand 306 (S2). The combined effect is to more tightly pull the strip between these two stands. A preferred way of adjusting tension is to change the gaps between the stands' working rolls. To implement this technique, the tension regulators receive information provided by respective tension sensors. Based on this information, the tension regulators provide commands to the hydraulic force regulators; these commands instruct the hydraulic force regulators to change the gaps between the working rolls of the respective stands.

FIG. 4 shows another representation of the cold rolling mill that illustrates the use of x-ray sensor data to control the operation of the mill. As discussed above, the cold rolling mill transfers a strip of steel 401 from uncoiling mechanism 402 to coiling mechanism 422 through a series of stands 404 (S1), 406 (S2), 408 (S3), 410 (S4), and 412 (S4). Stand 404 (S1) includes a top backing roll 414, a top working roll 416, a bottom working roll 418, and a bottom backing roll 420. The other stands include a similar arrangement of rolls.

The cold rolling mill also includes a plurality of x-ray sensors interspersed throughout the mill. Namely, a first x-ray sensor 426 (X0) is positioned prior to the first rolling stand 404. A second x-ray sensor 428 (X1) is positioned between the first and second rolling stands (404, 406). A third x-ray sensor 430 (X2) is positioned between the second and third rolling stands (406, 408). A fifth x-ray sensor 432 (X5) is positioned after the fifth rolling stand 412. These x-ray sensors measure the thickness of the strip by projecting x-ray electromagnetic radiation through the strip, and sensing the strength of radiation which passes through the strip.

Equipment 436 generically represents the controllers, drives, etc. used to operate the mill. For example, the equipment 436 may include a plurality of hydraulic force actuators/regulators used to govern the force applied to respective stands (e.g., as indicated by the exemplary control coupling 424). The equipment 436 may further include a plurality of speed regulators used to govern the speed of the stands in conventional fashion (e.g. as indicated by the exemplary control coupling 426). The equipment 436 may further include a plurality of automatic gauge control (AGC) devices for controlling the operation of the hydraulic force regulators and speed regulators on the basis of the output of the x-ray sensors. This has the effect of increasing or decreasing the thickness of the strip which exits the last stand (412) of the cold rolling mill, thereby, maintaining the thickness within the prescribed tolerances.

In one embodiment, one of the automatic gauge control (AGC) devices within equipment 436 receives the input from the last x-ray sensor 432 (X5). The outgoing thickness of the strip is measured as a function of the output of this x-ray sensor, and based on this measurement, the equipment 436 may make appropriate adjustments to the operation of the cold rolling mill (e.g., by increasing or decreasing the speed of the stand rolls). This adjustment mechanism therefore operates based on a feedback control model. Another automatic gauge control device may receive the input from the first x-ray sensor 426 (X0). The incoming thickness of the strip is derived based on the output of this x-ray sensor, and based on this measurement, the controller makes appropriate adjustments to the operation of the cold rolling mill. This adjustment mechanism therefore operates based on a feedforward control model. In addition, other automatic gauge control devices may receive the outputs of sensors 428 and 430. Based on these outputs, the gauge control devices may make adjustments to the cold rolling process to help stabilize the mass flow rate of the metal being processed by the mill. Generally speaking, the equipment 436 attempts to maintain the mass flow rate and thickness of processed steel at a constant level.

In the context of FIGS. 3 and 4, the control model used to control the cold rolling operation may comprise various reference points that define speed settings, tensions settings, gauge settings, etc. The settings define starting points for the various regulators used in the controllers shown in FIGS. 3 and 4. Different recipes may be appropriate for processing different classes of steel. As mentioned above, a remote computer, such as the remote system 110 shown in FIG. 1, supplies the recipes that define these reference points.

Figure 5:
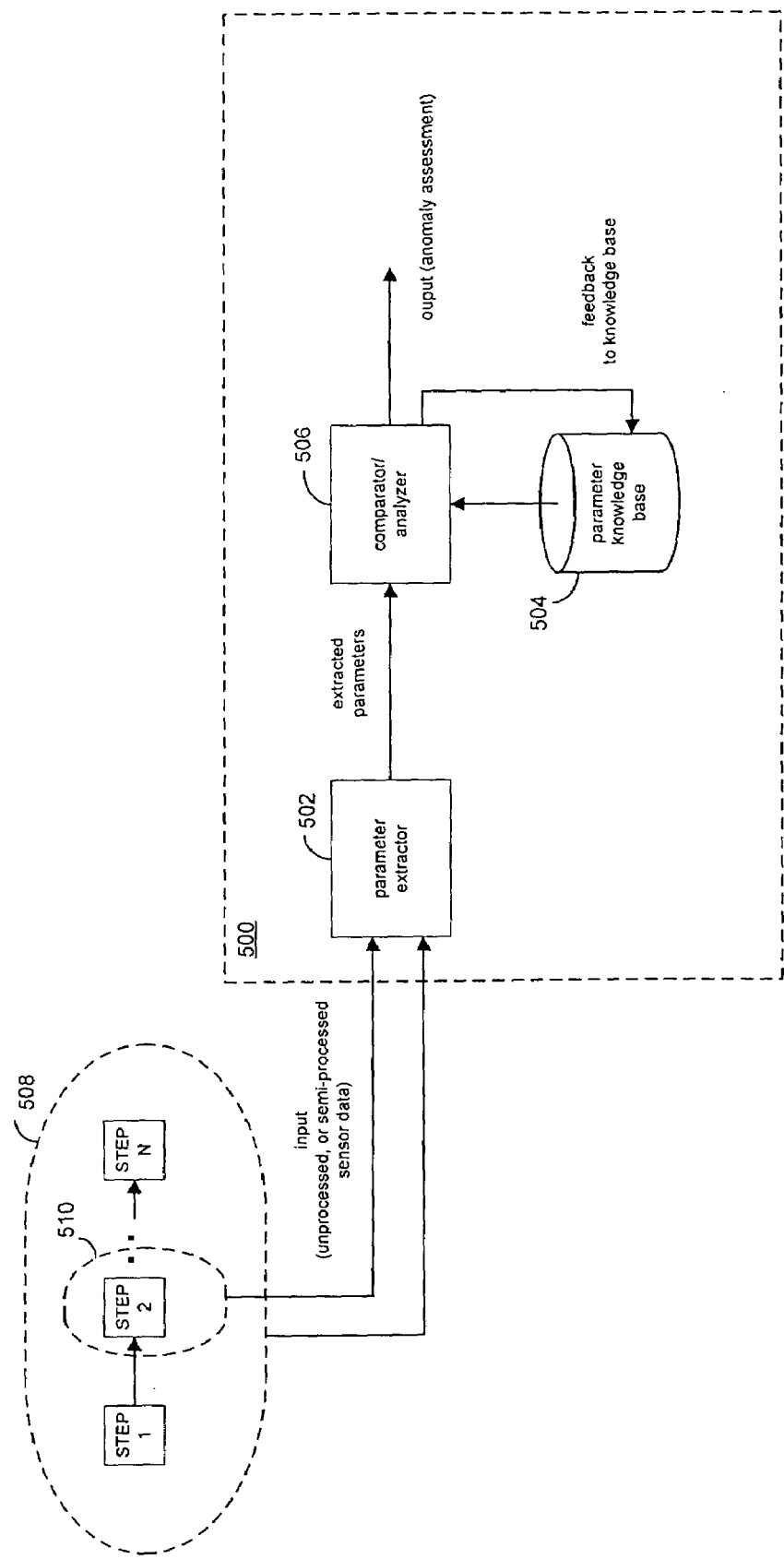
FIG. 5 shows logic for analyzing an anomaly.

FIG. 5 shows exemplary logic 500 for analyzing anomalies based on the output of the sensors. Such logic may, for instance, be implemented as the software functionality 122 shown in FIG. 1. In one embodiment, the logic 500 analyzes the sensor output from one principal step in the process. FIG. 5 illustrates this embodiment by showing the sensor output for a subprocess 510 being fed into the logic 500. In another embodiment, the logic 500 analyzes the sensor output from plural steps in the process. FIG. 5 illustrates this embodiment by showing the sensor output for plural subprocesses 508 being fed into the logic 500.

The logic 500 includes a parameter extractor 502. The parameter extractor 502 examines the characteristics of the sensor output, and then extracts one or more parameters that characterize the output. That is, the extractor generally examines a collection of data (such as a plurality of data points within a timeframe of data), and extracts one or more parameters that capture the general characteristics of such data. Different calculation techniques may be used to perform this extraction. In one embodiment, the logic 500 may compute an average, standard deviation, center of gravity, slope, etc. for use as extracted parameters. In another embodiment, the logic 500 may use an appropriately trained neural network to analyze the sensor output and to generate one or more high-level parameters that characterize the data. In another embodiment, the logic 500 may convert the signal to a different processing domain to extract the parameters (e.g., by converting the signal from the time domain to the frequency domain, or other domain). In another embodiment, the logic may perform a comparison of the signal with pre-stored templates to extract the parameters, where the templates may be selected to identify distinguishing features in the sensor output, such as characteristic signal envelopes, dramatic changes in signal level, etc. Those skilled in the art, will appreciate that other techniques for extracting parameters may be used to suit particular manufacturing environments that give rise to characteristic sensor output.

A parameter knowledge base 504 stores reference information regarding typical parameters that may be extracted by the parameter extractor 502. This knowledge base 504 also maps the stored parameters with an indication of the anomalies associated with the parameters.

A comparator/analyzer 506 receives the extracted parameters from the parameter extractor 502 and the reference information received from knowledge base 504. The comparator/analyzer 506 then compares the extracted parameters with the previously stored entries in the knowledge base 504. The comparator/analyzer 506 then generates an output which indicates a diagnosis pertaining to matching parameters. That is, the comparator/analyzer provides an indication whether the parameters extracted from the paramter extractor 502 match any of the reference information stored in the knowledge base 504, and an indication of the anomaly(ies) associated therewith. The comparator/analyzer 506 may also provide recommendations regarding steps that may be taken to remedy an anomalous condition associated with matching parameters, or may simply generate an appropriate alarm.

Figure 6:
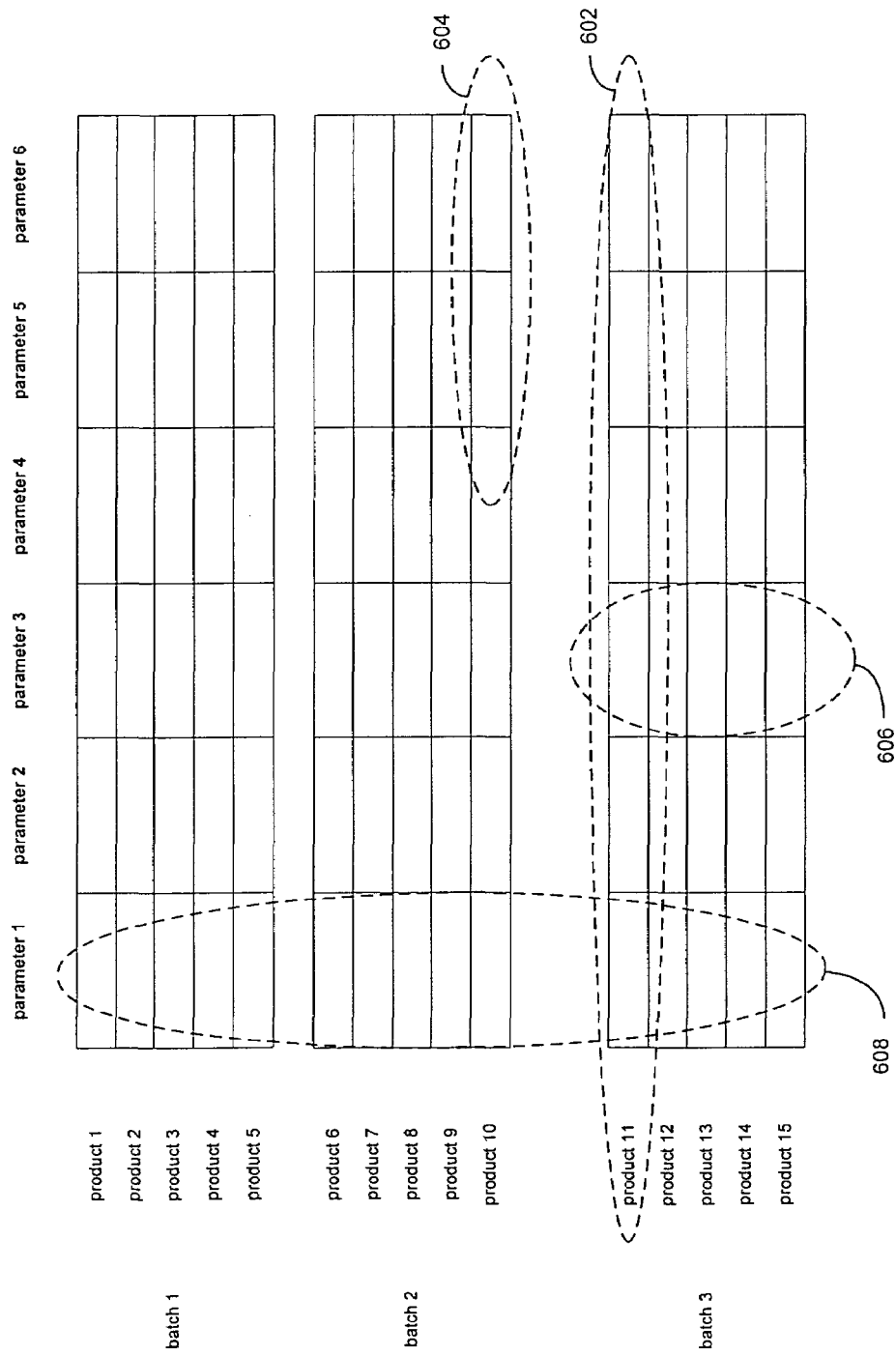
FIG. 6 shows a table for storing information extracted from sensor data for a plurality of products produced in a process.

FIG. 6 shows a table for storing parameters that may be extracted by the parameter extractor 502. In a first level of analysis, the comparator/analyzer 506 forms a diagnosis based on parameters associated with a single product (such as a single coil of metal or paper). For example, the comparator/analyzer 506 may examine the two parameters in set 604 associated with product No. 10, or the six parameters in set 602 associated with product No. 11. In another embodiment, the comparator/analyzer 506 may analyze one or more parameters extracted from multiple products to generate a diagnosis. For instance, the comparator/analyzer 506 may analyze compilations 606 or 608 to generate a diagnosis. Compilation 606 includes a single parameter extracted from product Nos. 11–15. This grouping permits analysis with respect to a single batch of products. Compilation 608 includes another single parameter extracted from product Nos. 1–15. This grouping permits analysis with respect to multiple batches of products. In still further embodiments (not shown), the comparator/analyzer 506 bases its diagnoses on yet further compilations of parameter sets, including compilations that include both intra-product samplings and inter-product samplings.

FIG. 7 provides an example of typical information extracted from some of the sensors used in a cold rolling mill. Signals presented using solid lines represent the direct time-trace output of sensors in the cold rolling mill. In contrast, dotted lines represent summary information extracted from multiple products. That is, each dot that appears in these lines may represent a respective value computed for a single product. In the context of FIG. 6, such a compilation reflects a vertical compilation of data (such as represented in sets 606 or 608). The summary data may be selected to best characterize the product, and may comprise, for instance, an average value computed from sensor data, a standard deviation value computed from sensor data, etc.

Each of the signals is characteristic of a different kind of anomaly present in the cold rolling process. To begin with, the first trace is denoted by the caption "heads swing very lightly." This phenomenon refers to a situation in which the process controller converges on within-tolerance conditions for strip production in a problematic manner. That is, a customer typically specifies desired strip characteristics, such as a strip thickness and permissible standard deviation from this thickness. When the cold rolling process commences (e.g., upon feeding the "head end" of the strip through the series of stands), the controller takes a finite amount of time to converge on the desired strip characteristics. This finite amount of time is attributed to the fact that the controller needs sufficient time to collect measurements on the quality of strip produced, and to interactively make appropriate adjustments to the process. The phenomenon "heads swing very lightly" refers to a condition in which the controller "zeros in" on the desired characteristics in an undesirable manner.

FIG. 7 shows an exemplary time trace of the "heads swing very light" phenomenon. The signal represents the output of one of the x-ray sensors, such as the X1 and/or X5 sensors shown in FIG. 4. In this particular case, the vertical axis represents thickness, where the zero reference denotes a desired thickness specified by the customer. The horizontal axis represents time. As shown there, the signal starts high at the initial feeding of the head end. It then drops below zero, then rises above zero, and then eventually converges on optimal levels. The portion where the thickness drops below tolerance represents an undesirable condition, as it may result in the production of a finished product having thin spots. By contrast, the preferred signal characteristic during the initial feeding operation (not shown) exhibits a quick convergence on the zero condition, without too much overshoot or other deviation.

The above-described phenomenon is attributed to the controller running below optimal levels. This cause encompasses any operational anomalies experienced by the controller.

The second signal characteristic shown in FIG. 7 is denoted by the caption "bad set up, excessive forces." This phenomenon refers to a situation in which the "set up" is not optimally suited for the grade. A "set up" defines a table of reference points used to control the operation of the cold rolling process, such as reference points that control the operation of the speed regulators, hydraulic force actuators, etc. A single table may be suitable for multiple grades if the grades have similar characteristics. The phenomenon "bad set up, excessive forces" refers to the use of a reference point table that is not appropriate for a particular grade, e.g., based on inaccurate mapping between the grade and its associated table.

FIG. 7 shows an exemplary signal characteristic of the "bad set up, excessive forces" phenomenon. Each dot represents a sampling of model feedback forces for a single coil. Accordingly, the series of dots may represent multiple coils in a batch (such as represented by coil grouping 608 shown in FIG. 6). In this particular case, the vertical axis represents model feedback forces. The horizontal axis represents time. As shown there, a first group of coils exhibits a first level of feedback forces. A second group of coils exhibits a second level of feedback forces. The difference between the first level of feedback forces and the second level of feedback forces indicates that the first and second grades represented by the two groups of coils may have been improperly grouped together. In other words, the two groups of coils should not have been mapped to the same reference point table.

As explained above, the above-described phenomenon is attributed to the mismapping of model grades (that is, the improper linking of model grades to reference point tables).

Figure 8:
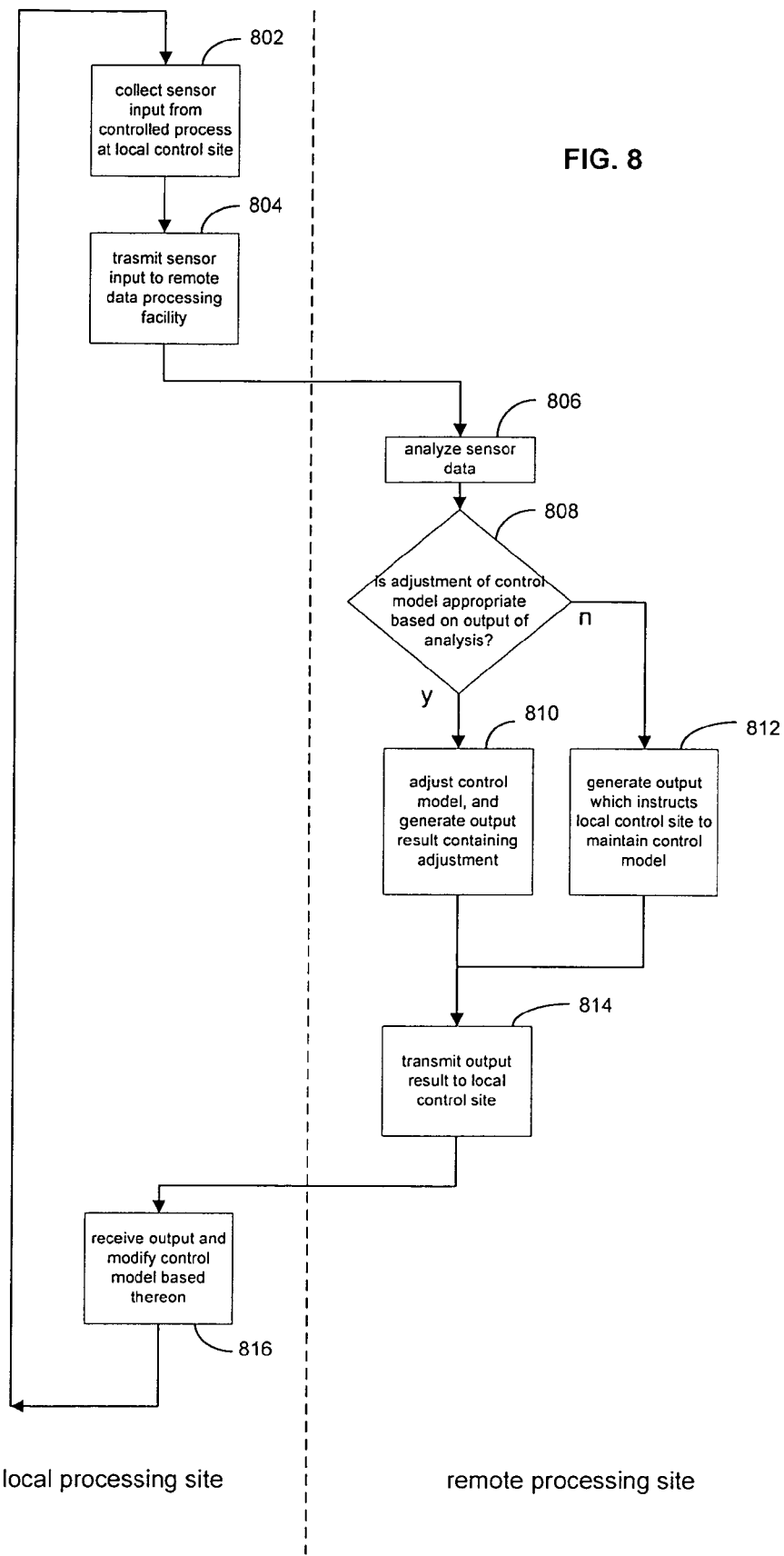
FIG. 8 shows a flowchart for explaining an exemplary process for adjusting a control model.

FIG. 8 shows an exemplary routine for performing the model adjustment described above with reference to FIG. 1. The local processing site (e.g., at the manufacturing plant) performs the processing operations described on the left side of FIG. 8, while the remote processing site (e.g., the remote server 110) performs the processing operations described on the right side of FIG. 8.

In step 802, the local processing site collects sensor output from the controlled process 102. At step 804, the local site forwards this sensor data to the remote site. At step 806, the remote site analyzes the sensor data. Such analysis may consist, for example, of the processing described previously in the context of FIGS. 5–7. That is, this process may comprise extracting parameters from the measured sensor output, and comparing those parameters with respect to a knowledge base of previously stored parameter information. Alternatively, this process may employ some other type of analysis. Then, in step 808, the remote site determines, on the basis of the analysis performed in step 806, whether adjustment of the control model is appropriate. If so, in step 810, the remote site adjusts the control model and generates an output result that reflects this adjustment. If no adjustment is warranted, in step 812, the remote site may optionally generate an output signal indicating that no adjustment is warranted. In step 814, the remote site transmits the above-described output result to the local site. In step 816, the local site receives the output result and modifies the control model based on instructions received from the remote site. The process is then repeated as the sensors used in the process collect additional sensor data. That is, the system may be configured such that the process shown in FIG. 8 is repeated at periodic intervals.

Figure 9:
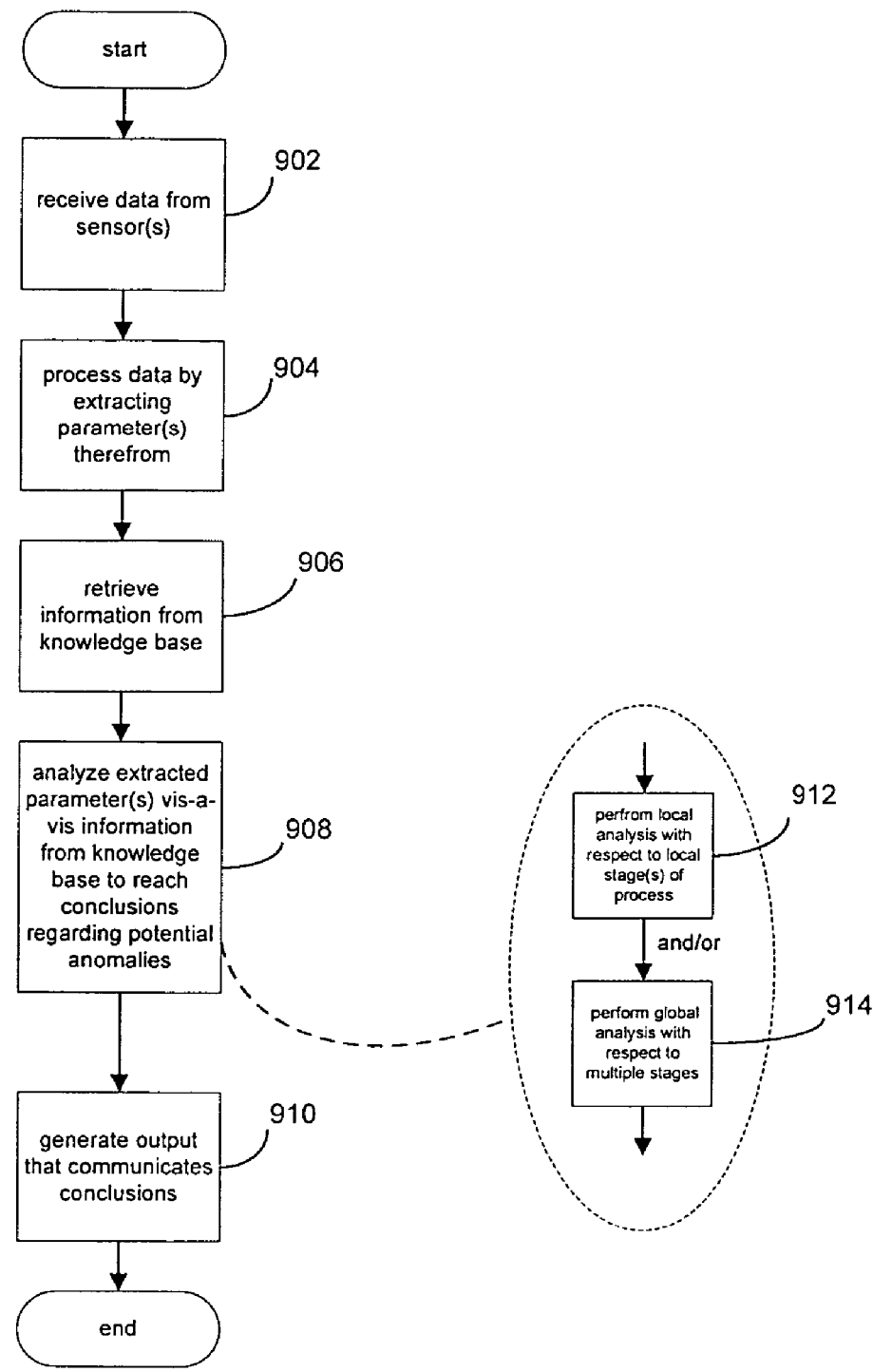
FIG. 9 shows an exemplary routine for analyzing an anomaly.

FIG. 9 is a flowchart that shows the extraction and analysis of parameters from sensor signal data. In step 902, data from at least one sensor is received. In step 904, the sensor data is processed by extracted high-level parameters from this information in the manner described above. In step 906, the reference information is retrieved from the knowledge base. In step 908, the technique compares the extracted parameters with the reference information to reach conclusions regarding potential anomalies in the process. In step 910, the technique generates and outputs information that reflects its conclusions regarding potential anomalies.

The analysis performed in step 908 may comprise two separate processing steps. Namely, in step 912, the technique examines the parameters extracted from one of the subprocesses to diagnoses any failures that may have occurred in this subprocess. For instance, in step 912, the technique examines parameters extracted from a cold rolling operation to determine whether any of the anomalies identified in FIG. 7 may have occurred. In addition, or alternatively, in step 914, the technique examines the parameters extracted from multiple subprocesses to diagnoses any failures that may have occurred in or one or more of these subprocesses. Step 914 may also provide an indication of the subprocess where the anomaly originated from. The analysis performed in step 914 may be based on similar principles to those identified with respect to FIGS. 5–7. Namely, the comparator/analyzer 506 may compare multiple parameters extracted from different subprocesses with respect to previously stored parameter values to detect the cause and origin of anomalies.

Although the invention was described above in the exemplary and illustrative context of steel production, it may be applied to other manufacturing environments, such as paper production, etc.

Other modifications to the embodiments described above can be made without departing from the spirit and scope of the invention, as is intended to be encompassed by the following claims and their legal equivalents.

What is claimed is:

1. A system for analyzing an anomalous condition, comprising:
    a process for producing a product, including:
        plural subprocesses for performing operations on the product,
        wherein each subprocess includes at least one actuator for controlling the respective subprocess,
        wherein each subprocess includes at least one sensor for measuring information pertaining to the status of the respective subprocess, and for generating an output based thereon;
    a parameter extractor for, for each of the subprocesses, receiving the output from the at least one sensor, and for generating at least one representative value that is characteristic of a pattern expressed in the output, the parameter extractor thus generating a plurality of representative values for the process as a whole;
    a knowledge base for scoring data including a plurality of representative values, and also including information which maps the representative values to associated anomalous conditions;
    an analyzer for analyzing the plurality of representative values output from the parameter extractor with respect to the data stored in the knowledge base, and for generating a diagnostic result which diagnosis an anomalous condition in the process, and also identifies the subprocesses which has caused the anomalous condition; and
    control logic for using the diagnostic result to affect corrective action to the at least one subprocess which has caused the anomalous condition by adjusting at least one actuator that controls the at least one subprocess.

2. The system of claim 1, wherein the process is for manufacturing metal, plastic extrusion or paper-based products.

3. The system of claim 1, wherein the process is for manufacturing metal products, and the process includes the following subprocesses;
    a hot rolling subprocess for reducing the thickness of the metal products in a heated state;
    a pickling subprocess for removing unwanted material from the metal products;
    a cold rolling subprocess for reducing the thickness of the metal products in a cold state using a plurality of rolling stands; and
    an annealing subprocess for heating and subsequently cooling the metal product.

4. The system of claim 1, wherein the analyzer is configured to provide a diagnosis based on samples taken from the at least one sensor for one discrete product.

5. The system of claim 1, wherein the analyzer is configured to generate summary values for respective discrete products, and to provide a diagnosis based on the summary values.

6. A system for analyzing an anomalous condition in a process for producing a product, the process including plural subprocesses for performing operations on the product, wherein each subprocess includes at least one actuator for controlling the respective subprocess, and wherein each subprocess includes at least one sensor for measuring information pertaining to the status of the respective subprocess, and for generating an output based thereon, comprising:
    a parameter extractor for, for each of the subprocesses, receiving the output from the at least one sensor, and for generating at least one representative value that is characteristic of a pattern expressed in the output, the parameter extractor thus generating a plurality of representative values for the process as a whole;
    a knowledge base for storing data including a plurality of representative values, and also including information which maps the representative values to associated anomalous conditions;
    an analyzer for analyzing the plurality of representative values output from the parameter extractor with respect to the data stored in the knowledge base, and for generating a diagnostic result which diagnoses an anomalous condition in the process, and also identifies at least one of the subprocesses which has caused the anomalous condition.

7. The system of claim 6, wherein the process is for manufacturing metal, plastic extrusion or paper-based products.

8. The system of claim 6, wherein the process is for manufacturing metal products, and the process includes the following subprocesses:
    a hot rolling subprocess for reducing the thickness of the metal products in a heated state;
    a pickling subprocess for removing unwanted material from the metal products;
    a cold rolling subprocess for reducing the thickness of the metal products in a cold state using a plurality of rolling stands; and
    an annealing subprocess for heating and subsequently cooling the metal product.

9. The system of claim 6, wherein the analyzer is configured to provide a diagnosis based on samples taken from the at least one sensor for one discrete product.

10. The system of claim 6, wherein the analyzer is configured to generate summary values for respective discrete products, and to provide a diagnosis based on the summary values.

11. A method for analyzing an anomalous condition in a process for producing a product, the process including plural subprocesses for performing operations on the product, comprising:
    for each of the subprocesses, providing sensor output from at least one sensor used to measure information pertaining to the status of the respective subprocess;
    for each of the subprocesses, extracting at least one representative value that is characteristic of a pattern expressed in the output, thus generating a plurality of representative values for the process as a whole;
    retrieving data from a knowledge base, the data including a plurality of representative values, and also including information which maps the representative values to associated anomalous conditions;
    analyzing the plurality of representative values output from the parameter extracting step with respect to the data stored in the knowledge base, and for generating a diagnostic result which diagnoses an anomalous condition in the process, and also identifies at least one of the subprocesses which has caused the anomalous condition; and using the diagnostic result to affect corrective action to the at least one of the subprocesses which has caused the anomalous condition by adjusting at least one actuator that controls the at least one subprocess.

12. The system of claim 11, wherein the process is for manufacturing metal, plastic extrusion or paper-based products.

13. The method of claim 11, wherein the process is for manufacturing metal products, and the process includes the following subprocesses:
   a hot rolling subprocess for reducing the thickness of the metal products in a heated state;
   a pickling subprocess for removing unwanted material from the metal products;
   a cold rolling subprocess for reducing the thickness of the metal products in a cold state using a plurality of rolling stands; and
   an annealing subprocess for heating and subsequently cooling the metal products.

14. The method of claim 11, wherein the analyzing step is configured to provide a diagnosis based on samples taken from the at least one sensor for one discrete product.

15. The method of claim 11, wherein the analyzing step is configured to generate summary values for respective discrete products, and to provide at diagnosis based on the summary values.

16. A method for analyzing an anomalous condition in a process for producing a product, the process including plural subprocesses for performing operations on the product, where each of the subprocesses provides sensor output from at least one sensor used to measure information pertaining to the status of the respective subprocess, the method comprising the steps of:
   for each of the subprocesses, extracting at least one representative value that is characteristic of a pattern expressed in the output of the at least one sensor, thus generating a plurality of representative values for the process as a whole;
   retrieving data from a knowledge base, the data including a plurality of representative values, and also including information which maps the representative values to associated anomalous conditions; and
   analyzing the plurality of representative values output from the parameter extracting step with respect to the data stored in the knowledge base, and for generating a diagnostic result which diagnoses an anomalous condition in the process, and also identifies at least one of the subprocesses which has caused the anomalous condition.

17. The method of claim 16, wherein the process is for manufacturing metal, plastic extrusion or paper-based products.

18. The method of claim 16, wherein the process is for manufacturing metal products, and the process includes the following subprocesses:
   a hot rolling subprocess for reducing the thickness of the metal products in a heated state;
   a pickling subprocess for removing unwanted material from the metal products;
   a cold rolling subprocess for reducing the thickness of the metal products in a cold state using a plurality of rolling stands; and
   an annealing subprocess for heating and subsequently cooling the metal products.

19. The method of claim 17, wherein the analyzer is configured to provide a diagnosis based on samples taken from the at least one sensor for one discrete product.

20. The method of claim 16, wherein the analyzer is configured to generate summary values for respective discrete products, and to provide a diagnosis based on the summary values.

* * * * *